No. 878,971. PATENTED FEB. 11, 1908.
A. MAIN.
WAGON.
APPLICATION FILED JUNE 29, 1906.
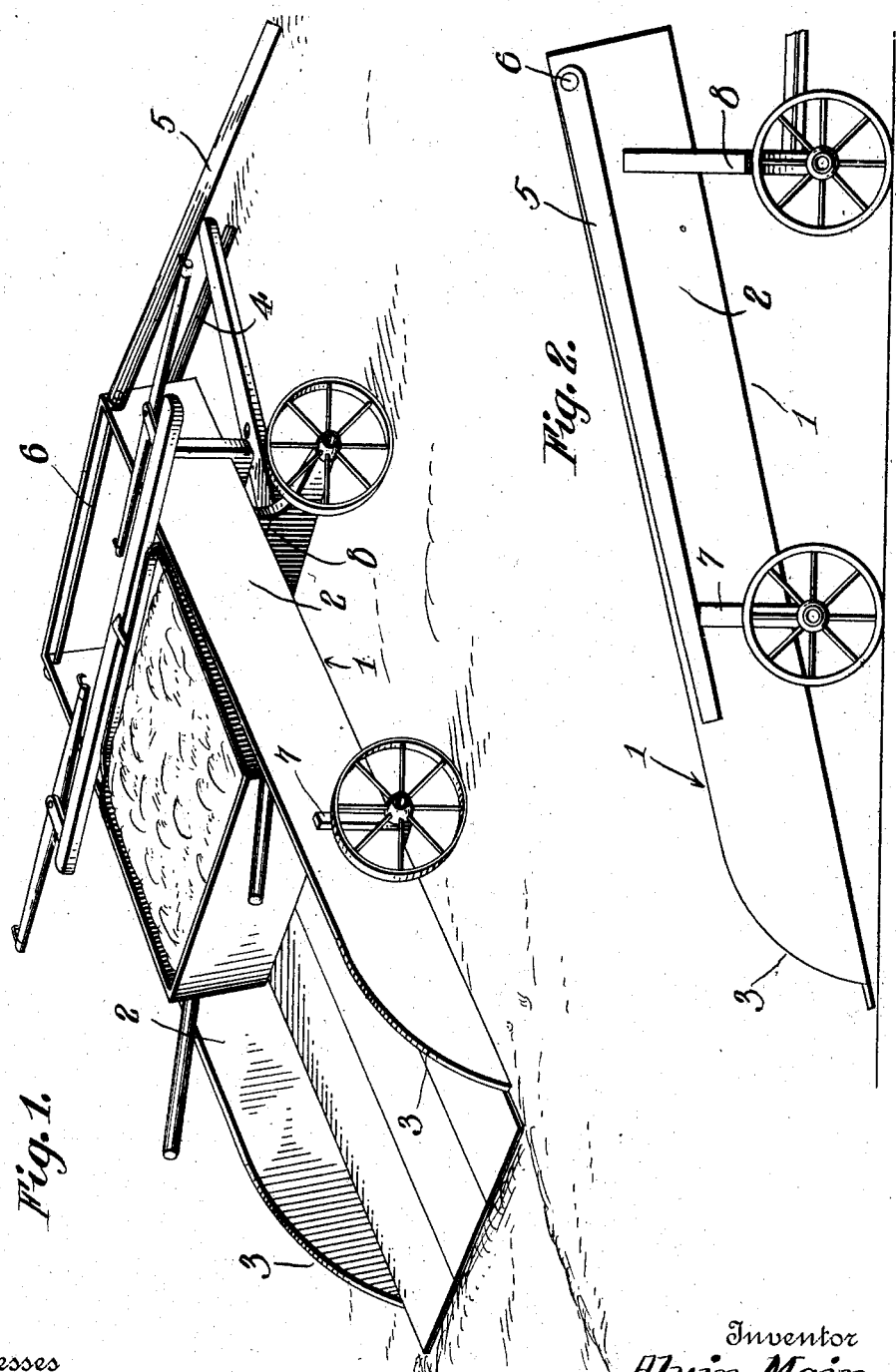
Witnesses
C. E. Smith.
L. O. Hilton
Inventor
Alvin Main.
by H. B. Willson & Co.
Attorneys

UNITED STATES PATENT OFFICE.

ALVIN MAIN, OF PITTSFIELD, ILLINOIS.

WAGON.

No. 878,971.  Specification of Letters Patent.  Patented Feb. 11, 1908.

Application filed June 29, 1906. Serial No. 324,094.

*To all whom it may concern:*

Be it know that I, ALVIN MAIN, a citizen of the United States of America, and a resident of Pittsfield, in the county of Pike and State of Illinois, have invented certain new and useful Improvements in Wagons, of which the following is a specification.

This invention relates to a wagon especially adapted for loading by an ordinary dump scraper.

The object of the invention is to provide a wagon, flat car, or other similar vehicle with simple and efficient means whereby it may be loaded by a horse power dump scraper.

In the accompanying drawings,—Figure 1 represents a perspective view of a wagon body constructed in accordance with this invention, showing the skids open or in operative position; Fig. 2 represents a side elevation thereof with the skids shown in closed or inoperative position.

In the embodiment illustrated a wagon body 1 is shown having its side boards, as 2, beveled or rounded at their rear ends, as at 3, to provide for the ready passage of the doubletree of a scraper thereover without catching or binding thereon. Two arms or skids 4 and 5 are arranged on the outside of said side boards 2 and pivotally connected at one end to the front ends of said boards by means of a bolt 6, which preferably extends transversely across the front end of the wagon body adjacent its dash or front board. These skids are designed to be thrown forward into the position shown in Fig. 2, when the wagon is being loaded to provide means on which the doubletree of the scraper may slide in its passage from the wagon to the ground. When not in use these arms or skids may be folded back against the side boards of the wagon and rest on the standards, as 7. This wagon body 1 is preferably provided at its front end with a bolster 8, of a height sufficient to raise the front end of said body and permit the rear end to come as near the ground as is practicable for the successful operation and loading thereof.

I claim as my invention:

1. A wagon body provided with bars pivotally connected at one end to the front of said body and adapted to swing thereover to provide for the sliding of the doubletree of a scraper thereover.

2. A wagon body having the rear ends of its side boards beveled to provide for the easy riding thereover of a loading scraper, and means pivotally mounted to swing over the front of said body to permit the sliding of the doubletree of a scraper thereover.

3. A wagon body provided with bars pivotally connected at one end to the front ends of the side boards thereof on the outer faces of said boards.

4. A wagon body having bars arranged on opposite sides thereof, and a bolt pivotally connecting one end of said bars to said body.

ALVIN MAIN.

Witnesses:
 EDWIN JOHNSTON,
 LOUIS KLEMM, Jr.